United States Patent [19]
Guyer

[11] 4,031,767
[45] June 28, 1977

[54] SPLICED BELTING

[75] Inventor: Nathan E. Guyer, Stoneham, Mass.

[73] Assignee: American Biltrite Inc., Cambridge, Mass.

[22] Filed: Jan. 23, 1976

[21] Appl. No.: 651,859

[52] U.S. Cl. .............................. 74/231 J; 198/847
[51] Int. Cl.² .................. F16G 1/00; F16G 5/00; B65G 15/30
[58] Field of Search .......... 74/231 J, 231 R, 231 P; 198/193, 165

[56] References Cited
UNITED STATES PATENTS

| | | | |
|---|---|---|---|
| 3,224,566 | 12/1965 | Elliott | 198/193 |
| 3,481,807 | 12/1969 | Kanamori | 198/193 X |
| 3,693,218 | 9/1972 | Jaubert et al. | 74/231 J X |

Primary Examiner—Leonard H. Gerin

[57] ABSTRACT

Conveyor belting ends, each comprising a pair of carcass plies separated by an intermediate elastomeric ply and enclosed by a pair of outer rubber plies, are spliced by removing material from various plies to expose surfaces of terminal portions of the carcass plies and then interfitting the two belting ends, after the application of tie gum to exposed surfaces. The interfitting is done such that each terminal portion of each carcass ply overlies the terminal portion of the associated carcass ply on the other belting end, thereby assuring two uninterrupted carcass plies at the longitudinal location on the belt where each carcass ply is severed.

10 Claims, 4 Drawing Figures

SPLICED BELTING

BACKGROUND OF THE INVENTION

This invention relates to a method for splicing conveyor belting and to the belt construction resulting from such a splice. The present invention can be viewed as an improvement on the splicing arrangement described in Elliott U.S. Pat. No. 3,224,566, issued Dec. 21, 1965, assigned to the Assignee of the present invention, and incorporated herein by reference.

Conveyor belting is customarily spliced at the site where it is to be used, whether a new installation or a repair situation. Because of this, it is highly desirable that a suitable splice can be made without the necessity of special equipment. Nonetheless, the splice should be strong, of substantially uniform thickness with the remainder of the belt, and free from substantial surface irregularities. A common splice has been simply to butt-join the aligned plies of adjacent belt ends using an adhesive of some type, the series of such butt joints often being longitudinally offset one from another. This arrangement, while simple, produced a very weak splice.

The above-mentioned U.S. Pat. No. 3,224,566 teaches a splice which is strong and does not impair belt uniformity, but it requires the manufacture, and stocking, of a reinforcing insert piece that bridges the interruptions in the strength-producing plies of the belting. Accordingly, a principle object of the present invention is to provide a splicing arrangement which results in a desirable splice in terms of the criteria discussed above, but which avoids the logistics problems of obtaining, stocking, and distributing the inserts.

SUMMARY OF THE INVENTION

Briefly, the invention features a method for forming a splice between two ends of conveyor belting, each of the ends comprising at least two carcass plies, an elastomeric ply intermediate the carcass plies, and a pair of outer plies of rubbery compound covering the carcass plies. The splicing method comprises the steps of: (a) removing segments of plies to expose at least one surface of each carcass ply adjacent each of the belting ends, (b) coating exposed carcass ply surfaces with a layer of tie gum, (c) interfitting the belting ends in a manner that each carcass ply on each belting end overlaps a carcass ply of the other belting end, with a layer of tie gum intermediate the carcass plies of each overlapped pair, and (d) vulcanizing the belting throughout the region of that overlapping. Preferably, the step (a) includes, for each belting end, the removal of an outer ply and of the intermediate ply adjacent the opposite surfaces of one carcass ply terminal portion, thereby exposing both surfaces of that carcass ply terminal portion. In this preferred embodiment, the step (a) further includes, with respect to each of the belting ends, removing a segment of the intermediate ply so as to form a slot-like recess which is defined by opposed surfaces of the two carcass plies. Finally, the step (c) includes the placement of each of the carcass ply terminal portions, which have been exposed, into the slot-like recess of the other belting end.

In another aspect, the invention features conveyor belting including a spliced area. The belting comprises at least two carcass plies, an elastomeric ply intermediate the carcass plies, and outer plies of rubbery compound. In the spliced area, all carcass plies are severed with the severed locations being spaced apart longitudinally. Terminal portions of each carcass overlap each other with the overlapping carcass ply surfaces being coated with a tie gum.

BRIEF DESCRIPTION OF THE DRAWING

Other objects, features, and advantages of the invention will appear from the description below of a preferred embodiment which is shown in the accompanying drawing, in which the thicknesses of various belting plies have been exaggerated for clarity.

In the drawing.

DETAILED DESCRIPTION OF A PARTICULAR PREFERRED EMBODIMENT

Figure 1:
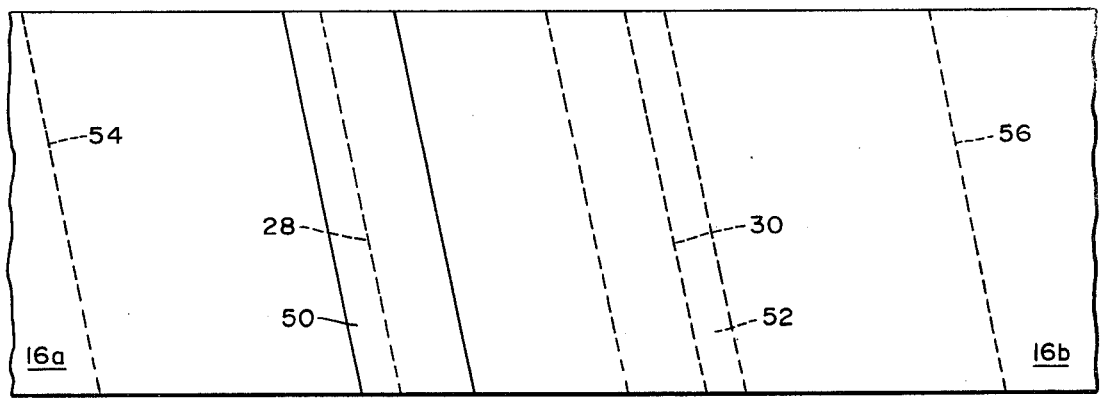
FIG. 1 is a plan view of a piece of the belting incorporating a slice according to the present invention.

Referring to the drawing, the illustrated belting is formed as a five-ply laminate. To distinguish between common features of the right and left segments of belting to be joined by the splice (which are shown separately in FIGS. 3 and 4), the suffix "a" is used with reference numerals referring to the left end portion of the belt and the suffix "b" applied to the right end. Since in their basic construction the two ends are, of course, identical, as to some features a description of only one such end will be given.

Tensile strength is imparted to the belting by two carcass plies 10a and 12a. These plies typically comprise sheets of strong, tough textile fabric coated with adhesive and impregnated with rubber or synthetic resin. A layer 14a of rubber composition or other elastomeric material lies intermediate the carcass plies and is bonded thereto by vulcanization or an adhesive. Outer cover plies 16a and 18a are bonded in a conventional manner to the internal sandwich consisting of the carcass plies and the intermediate layer 14a and may be formed of a rubber composition or synthetic resin, according to the purpose for which the conveyor belt is intended.

Figure 3:
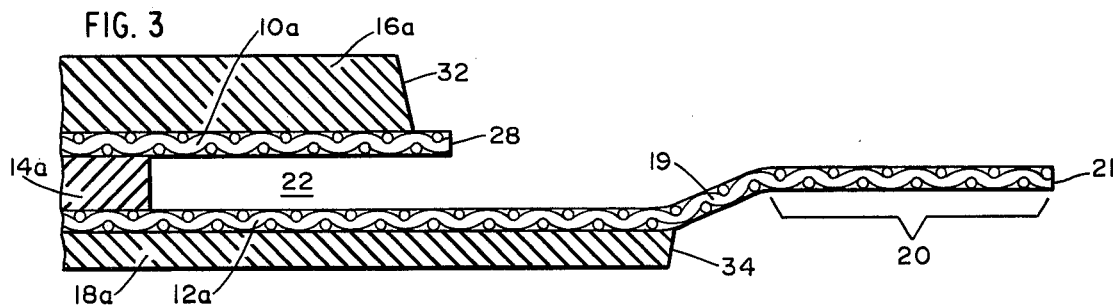
FIGS. 3 and 4 are longitudinal sections of the two belting ends as prepared, according to the present invention, for splicing.
Figure 4:
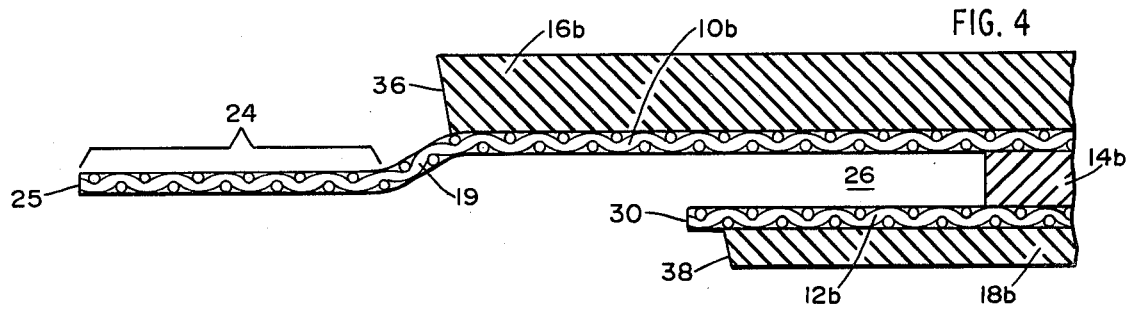

FIGS. 3 and 4 illustrate initial steps in the preparation for the splicing of two belting ends, each having the structure just described. As is evident from those figures, sections of the various plies have been removed as a preliminary step in the splicing. As a result of the removal of ply portions, the lower carcass ply 12a is provided with a terminal segment 20 adjacent the severed end 21 of the ply 12a and having both of its surfaces exposed. The lower cover layer 18a has been cut back to the point 34 to provide the exposed lower surface of terminal portion 20. The intermediate layer 14a, on the other hand, has been cut back much further, thereby exposing a much longer portion of the upper surface of carcass ply 12a and defining a volume or recess 22 intermediate the carcass plies 10a and 12a. The depth of this recess 22 is defined by the location 28 at which the upper carcass ply 10a has been cut off, that location being well back of the terminal portion 20 of carcass ply 12a and chosen to define a depth of the recess 22 which is suitable to receive the terminal portion 24 of carcass ply 10b (see FIG. 4) which has been prepared in a manner similar to that of carcass ply 12a (see FIG. 3). A similar recess 26 is provided intermediate carcass plies 10b and 12b and is suitably sized to receive the terminal portion 20 of carcass ply 12a. Connective segments 19 of carcass plies 12a and 10b permit the transverse offset of terminal portions 20 and 24 required by the splice without excessively sharp bends in the carcass plies which might reduce the strength of the splice.

Figure 2:
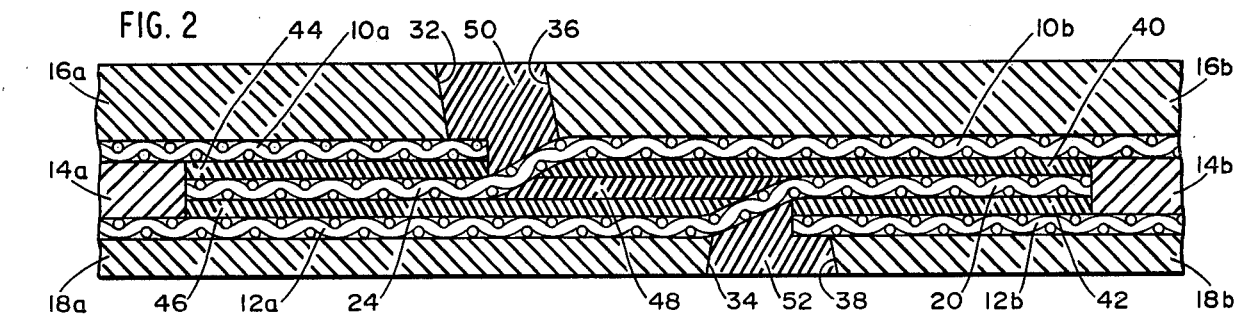
FIG. 2 is a corresponding longitudinal section.

Referring to FIG. 2, it will be seen that all exposed carcass ply surfaces have been coated with a conventional tie gum (indicated at 40, 42, 44, 46) for bonding the carcass plies to each other. After such coating, the carcass ply portion 20 is inserted into the recess 26 and the carcass ply terminal portion 24 is inserted into the recess 22. A small additional layer 48 of tie gum fills the void that would otherwise result in the center region of the splice between the connective portions 19 of the carcass plies 12a and 10b.

To complete the splice, conventional insert strips 50 and 52 (typically an uncured rubber compound) are inserted between the end surfaces 32, 36 of plies 16a and 16b and end surfaces 34, 38 of plies 18a, 18b, respectively. Subsequent vulcanization of the entire splice region, under pressure exerted by a conventional clamping arrangement, causes the insert strips 50 amd 52 to flow and substantially fill the voids in the manner indicated in FIG. 2.

As is evident from FIG. 1, all ply edges (e.g., edges 21, 28, 32, and 34 of the left belt end shown in FIG. 3) are cut on a bias, as is conventional, to distribute forces experienced by the splice as the belting passes over a pulley.

The region of the splice in the belting is indicated in FIG. 1 and extends between the lines 54 and 56, which indicate the end faces of recesses 22 and 26. In a typical construction, the length of the terminal portions 20, 24 of the carcass plies 12a, 10b (equal to the distance between lines 54 and 28 and between lines 56 and 30 in FIG. 1) will be about 15 inches. A suitable separation of the terminal portions (i.e., the distance between lines 28 and 30 in FIG. 1) is also about 15 inches, so that the entire length of the splice will be about 45 inches. With such a splice, the length along the belting of the connective segments 19 of carcass plies 12a and 10b will be about four and one half inches.

Referring to FIG. 2, it will be seen that in the completed splice each carcass layer of each belting end is overlapped by the associated carcass layer of the other belting end (i.e., carcass plies 10a and 10b overlap and carcass plies 12a and 12b overlap. This overlapping, of course, provides more strength than the prior art butt joints. Additionally, the overlapping is achieved using only continuous segments of the carcass plies integral with the remainder of the belting (i.e., special inserts as required by the above-mentioned U.S. Pat. No. 3,244,566 are not required).

As is also evident from FIG. 2, at the location of each cut end of a carcass ply there are two other uninterrupted carcass plies to maintain the belting strength at that location. Additionally, the insertion of terminal carcass ply portions 20 and 24 between the carcass plies of the other belting end provides for the transmission of force substantially along the belting centerline, as is desirable.

While it should be understood that the features of the present invention can be used with a wide variety of belting constructions and compositions, a particular example is given below.

EXAMPLE

The longitudinal dimensions of the splicing regions given above, with an overall length of 45 inches, were employed. The belting was a five-ply laminate construction such as shown in FIG. 2 and is available under the designation "CE 1602" from the Boston Industrial Products Division of American Biltrite, Inc., Cambridge, Massachusetts. In this belting, the carcass plies have a thickness of substantially 0.030 inch and are separated by an intermediate layer of conventional belting center ply, or "skim coat", having a thickness of about 0.065 to 0.070 inch. The top and bottom cover plies have a thickness of 3/16 inch and 1/16 inch, respectively.

The various plies of such belting were peeled and cut to provide a sectional configuration of two belting ends as shown in FIGS. 3 and 4 and were bias cut across the belt as shown in FIG. 1. The exposed surfaces of the carcass plies were coated with a rubber cement and then coated with tie gum to a thickness of 0.030 inch (see layers 40, 42, 44, 46, of FIG. 2). A centrally located additional layer 48 of tie gum of thickness of 0.010 inch was applied to one of the tie gum layers 40 or 46, prior to interfitting of the two belting ends to be spliced. After such interfitting, the surfaces between cover edges 32, 36 and 34, 38 were coated with a rubber cement and uncured rubber composition strips were inserted. The splice region was then vulcanized by application of mechanical pressure and heat.

While a particular preferred embodiment of the present invention has been illustrated in the accompanying drawing and described in detail herein, other embodiments are within the scope of the invention and the following claims.

What is claimed is:

1. The method of forming a splice between two ends of conveyor belting each comprising at least two carcass plies, an elastomeric ply intermediate said carcass plies, the method comprising the steps of
   a. removing segments of plies of said belting to expose at least one surface of each carcass ply adjacent each said belting end,
   b. coating exposed carcass ply surfaces with a layer of tie gum,
   c. interfitting said belting ends such that each said carcass ply of each said belting end overlaps a carcass ply of the other belting end, with a layer of tie gum intermediate the carcass plies of each overlapped pair, and
   d. vulcanizing the belting throughout the region of said overlapping.

2. The method of claim 1 wherein said step (a) includes cutting away said outer plies of each belting end to a degree such that aligned outer plies of said two belting ends are spaced apart after said step (c), the method further including the step, prior to said step (d), of filling the void between the spaced apart outer plies with an uncured rubbery compound.

3. The method of claim 1 wherein said step (a) includes for each belting end, the removal of an outer ply and of said intermediate ply adjacent opposite surfaces of a terminal portion of one of said carcass plies, thereby exposing both surfaces of said one carcass ply, said step (a) further including, with respect to each said belting end, removing a segment said intermediate ply so as to form a slot-like recess which is defined by opposed surfaces of said two carcass plies, said step (c)

including the placement of each said carcass ply terminal portion into the slot-like recess of the other belting end.

4. The method of claim 3 wherein said step (a) includes cutting away said outer plies of each belting end to a degree such that aligned outer plies of said two belting ends are spaced apart after said step (c), the method further including the step prior to said step (d) of filling the void between the spaced apart outer plies with an uncured rubbery compound.

5. In conveyor belting comprising at least two carcass plies, an elastomeric ply intermediate said carcass plies, and outer plies of rubbery compound; a spliced area in which all carcass plies are severed, the severed locations being spaced apart longitudinally of the belting, terminal portions of each carcass ply overlapping each other, overlapping carcass ply surfaces being coated with tie gum.

6. In conveyor belting, a splice as described in claim 5 wherein a first carcass ply terminal portion is received in a first volume provided by removal of a first section of said elastomeric ply, and a second carcass ply terminal portion is received in a second volume provided by removal of a second section of said elastomeric ply.

7. In conveyor belting, a splice as described in claim 6 further characterized in that said outer plies are severed and the aligned ends of each severed outer ply are spaced apart from each other, the volume between each pair of spaced apart outer ply ends being filled with a rubber compound.

8. In conveyor belting, a splice as described in claim 6 wherein the remainders of said first and second volumes that are not occupied by said carcass ply terminal portions are filled with tie gum.

9. In conveyor belting, a splice as described in claim 8 wherein each said carcass ply terminal portion is substantially centered in a said volume with a layer of tie gum intermediate said terminal portion and each of the adjacent carcass plies defining the volume.

10. In conveyor belting, a splice as described in claim 9 further characterized in that said outer plies are severed and the aligned ends of each severed outer ply are spaced apart from each other, the volume between each pair of spaced apart outer ply ends being filled with a rubber compound.

* * * * *

UNITED STATES PATENT AND TRADEMARK OFFICE
CERTIFICATE OF CORRECTION

PATENT NO. : 4,031,767
DATED : June 28, 1977
INVENTOR(S) : Nathan E. Guyer

It is certified that error appears in the above-identified patent and that said Letters Patent are hereby corrected as shown below:

Column 3, line 34 before "construction" insert --splice--

In the claims:

Claim 1, column 4, line 40 after "plies," insert --and outer plies of rubbery compound covering the carcass plies,--

Signed and Sealed this

Eighth Day of November 1977

[SEAL]

Attest:

RUTH C. MASON
Attesting Officer

LUTRELLE F. PARKER
Acting Commissioner of Patents and Trademarks